Figure 1:
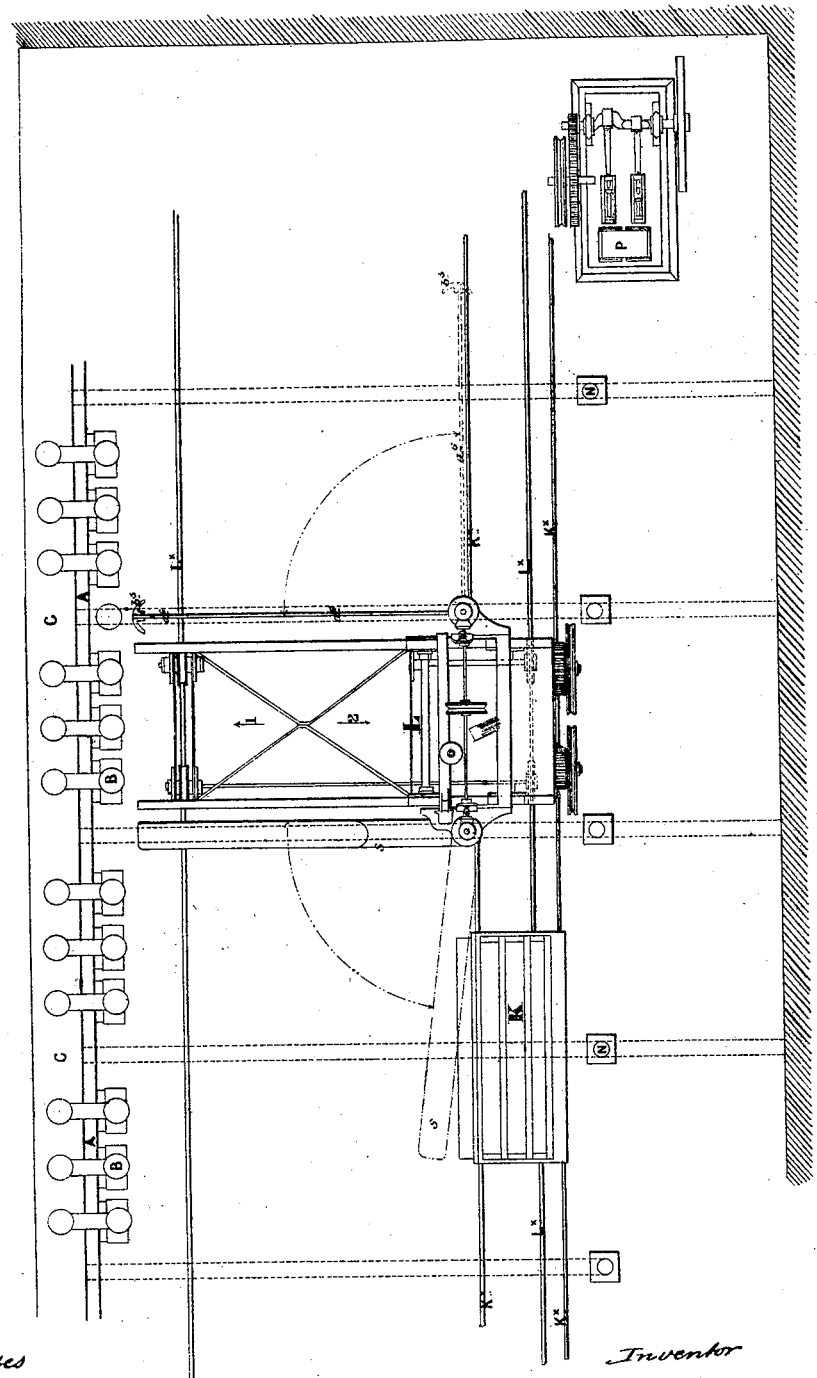

J. J. HOLDEN.

Improvement in Apparatus for Charging and Discharging Gas-Retorts.

No. 114,682

6 Sheets--Sheet 2.

Patented May 9, 1871.

J. J. HOLDEN.
Improvement in Apparatus for Charging and Discharging Gas-Retorts.
No. 114,682. Patented May 9, 1871.
6 Sheets--Sheet 3.
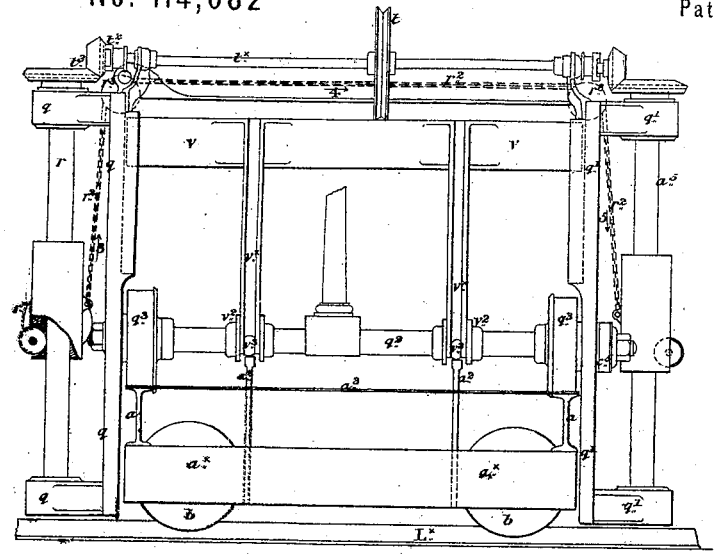
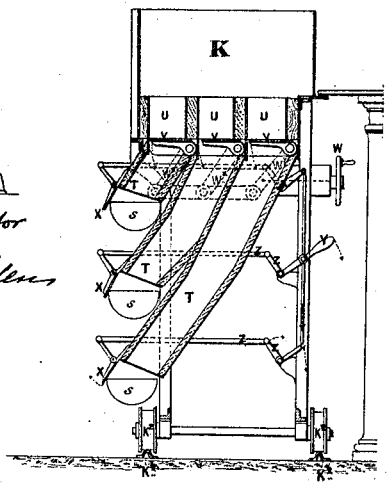
FIG. 4.
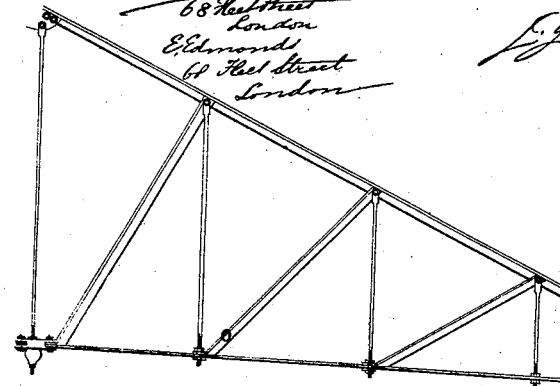
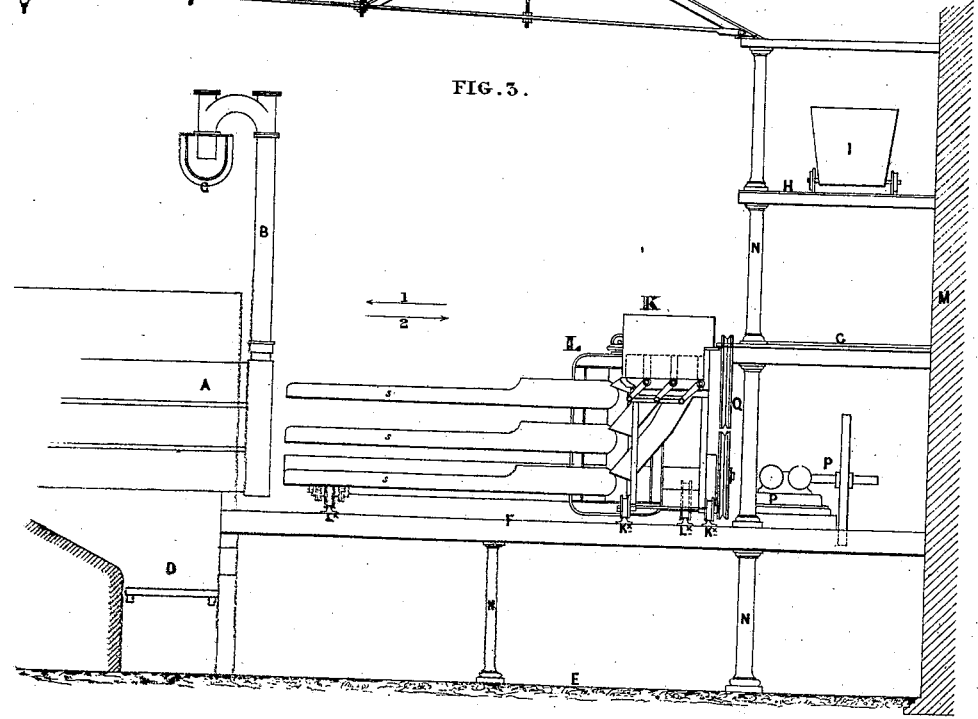
FIG. 3.

J. J. HOLDEN.
Improvement in Apparatus for Charging and Discharging Gas-Retorts.
No. 114,682 Patented May 9, 1871.

No. 114,682. PATENTED MAY 9, 1871.
J. J. HOLDEN.
APPARATUS FOR CHARGING AND DISCHARGING GAS RETORTS.
6 SHEETS—SHEET 6.
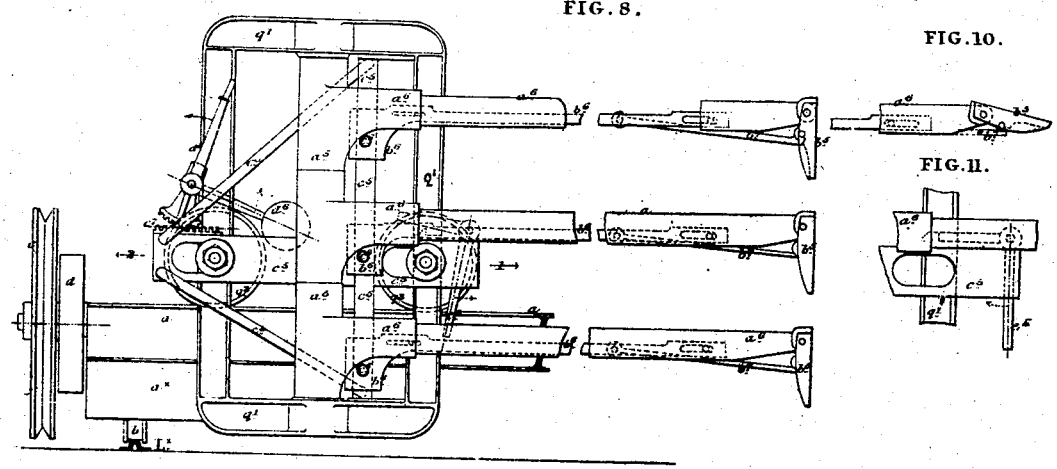
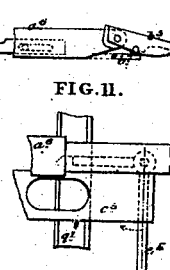
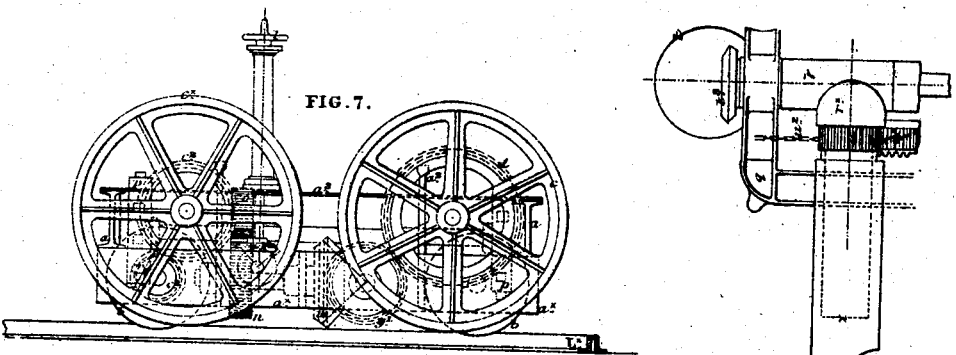
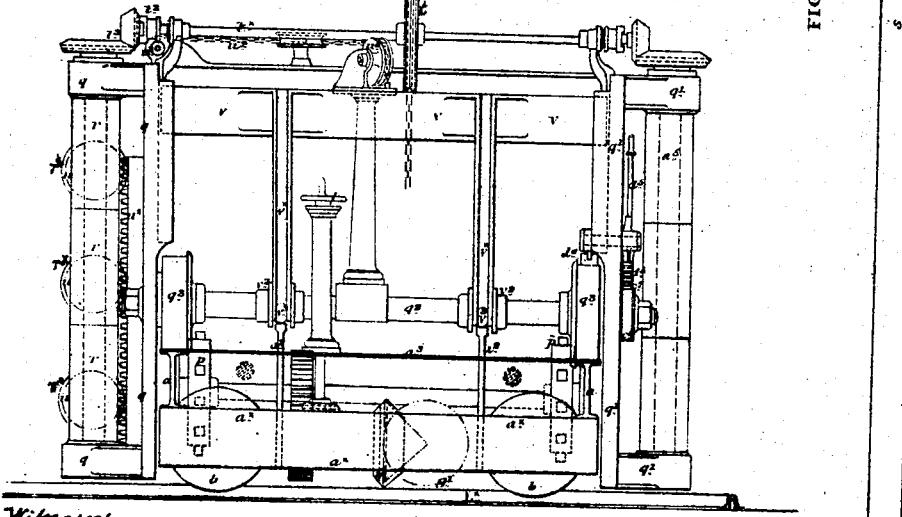
Witnesses
Inventor:
J. J. Holden

United States Patent Office.

JAMES JOHN HOLDEN, OF BERMONDSEY, ENGLAND.

Letters Patent No. 114,682, dated May 9, 1871.

---

IMPROVEMENT IN APPARATUS FOR CHARGING AND DISCHARGING GAS-RETORTS.

---

The Schedule referred to in these Letters Patent and making part of the same.

---

I, JAMES JOHN HOLDEN, of Mark Lane, in the city of London, and of Bermondsey, in the county of Surrey, engineer, a subject of the Queen of Great Britain, have invented certain "Improvements in Apparatus for Charging and Discharging Gas-Retorts and for other similar purposes," of which the following is a specification.

My apparatus for charging and discharging gas-retorts comprises a traveling frame, (hereinafter called "carrier,") carrying a set of scoops, feeders, or charging-tools or instruments on one side, and a set of rakers, rakes, clearers, or drawing or discharging tools or instruments on the other side, and having a to-and-fro motion on a traversing frame or carriage, (hereinafter called "the traveler.")

The set of scoops or charging instruments and the set of rakes or discharging tools or instruments are mounted and arranged, each set respectively, on an upright spindle, or on a framing on the carrier, so that each set is capable of being swung, turned, or moved partially around, in order that such set may be brought either lengthwise of or at an angle to the general body of the apparatus, as required.

One mode of effecting this action of the sets of tools is by mounting each such set on a vertical spindle and actuating such spindle through gearing by a transverse shaft turned by a central hand-wheel.

An improved method of communicating motion to the traveling and traversing frame—that is to say, to the carrier and traveler—consists in using a chain, band, or wire rope passing over pulleys, and working shafting carrying reversing-gear which can be engaged and disengaged as required.

Another mode of transmitting motion to the said frames is by pinions thereon gearing into racks on the rails, trams, or ways on which the said frames travel.

To prevent the lateral tipping of the carrier it may carry rollers or wheels working on a flange, tram-rail, or way on the traveler or traversing frame.

An improved arrangement for turning the scoops, first to receive their charges and convey them to the retorts, and then to discharge them into the retorts, consists of a rack conected by a rope, chain, or the like with a counterbalance-weight, and engaging with pinions on the scoops or charging-tools. The weight is raised in the back-travel of the frame by its passage over an incline or inclines, whereby the rack is depressed, and it thereupon turns the scoops so as to bring their-openings upward ready to receive their charges and carry them to the retorts. The rack is retained in such depressed position by a lever, which engages it till it (the lever) comes against a stop and releases the rack, allowing it to rise and turn the scoops so that they discharge their contents into the retorts.

To ease the motion the weight-frame may travel upon and between rollers.

Instead of the rack and pinions chains may be used, connecting the weights and scoop for the above purpose, the chains being combined with a lever for controlling the action, as above described.

An improved mode of mounting the scoops consists in fitting them, by hollow ends, on arms on the upright spindle. Each scoop and each rake may be mounted separately on the upright spindle, so as to be worked separately.

My improved rakers or discharging-tools consist of a set of bars or rods, having at their ends rakes, spoons, tines, or movable tips acted on by bars, plates, or rods sliding on the other bars, or rods, and worked by a piece sliding to and fro, and thereby acting on the sliding bars or plates and causing them to work the rake ends, spoons, tines, or tips. The sliding piece may be actuated by a rack thereon engaging with a toothed weight, wheel, lever, or cam, controlled or not by a pawl. A bell-crank coming against an abutment causes or allows the weight, wheel, lever, or cam to fall or turn.

I sometimes modify the apparatus by connecting together and suspending one or more scoops and one or more rakes by a cord, chain, or the like passing over pulleys, or by equivalent connecting and suspending appliances, so that when the scoop rises the rake falls, and *vice versa;* or they may be made to rise and fall independently. Sometimes I add, at the outer end or tip of the rakes, a scraper for scraping the upper portions of the retorts.

I also employ an improved feeder or tender to charge the scoop, such feeder or tender consisting of a number of chutes, one for each scoop, the chutes being of different lengths to suit the heights of the scoops, and traveling together on rails, trams, or ways on the floor separate from those of the carrier and traveler. The chutes pass under a fixed platform or receptacle, whence they receive supplies of coal. Each chute is opened and closed by hinged or jointed traps or doors. Hinged or jointed plates at bottom prevent spilling or escape of coal when the scoops are being charged.

The above arrangements may be applied and adapted in like manner to apparatus for purposes similar to the above object of charging and discharging gas-retorts.

The accompanying drawing exemplifies apparatus constructed according to my invention, and shown as applied to the charging and discharging of gas-retorts.

Figure 1, plan showing general arrangement of apparatus.

Figure 2:
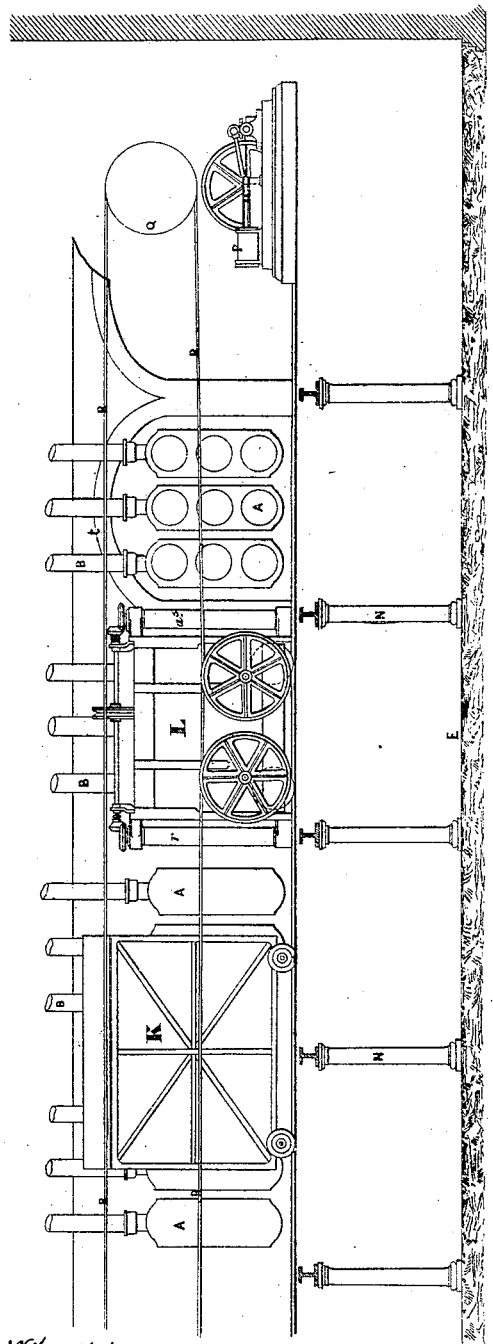

Figure 2, elevation of same.

Figure 3, transverse section of same.

Figure 14:
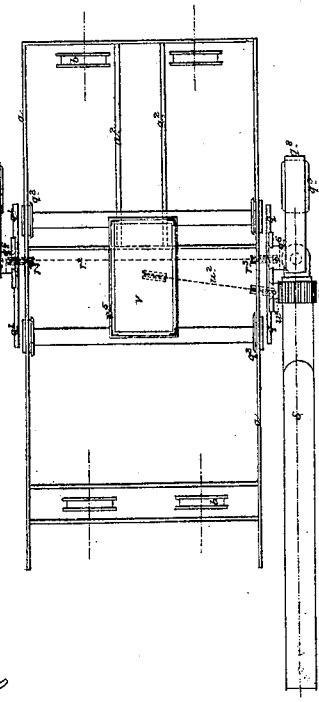
Figure 15:
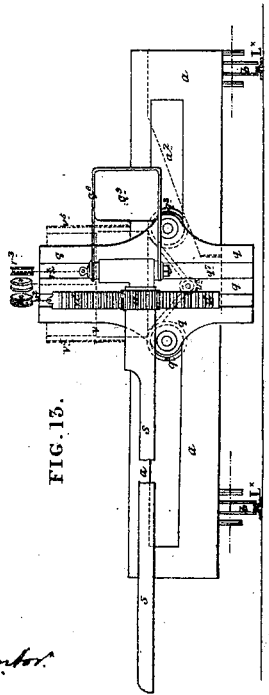
Figure 4:
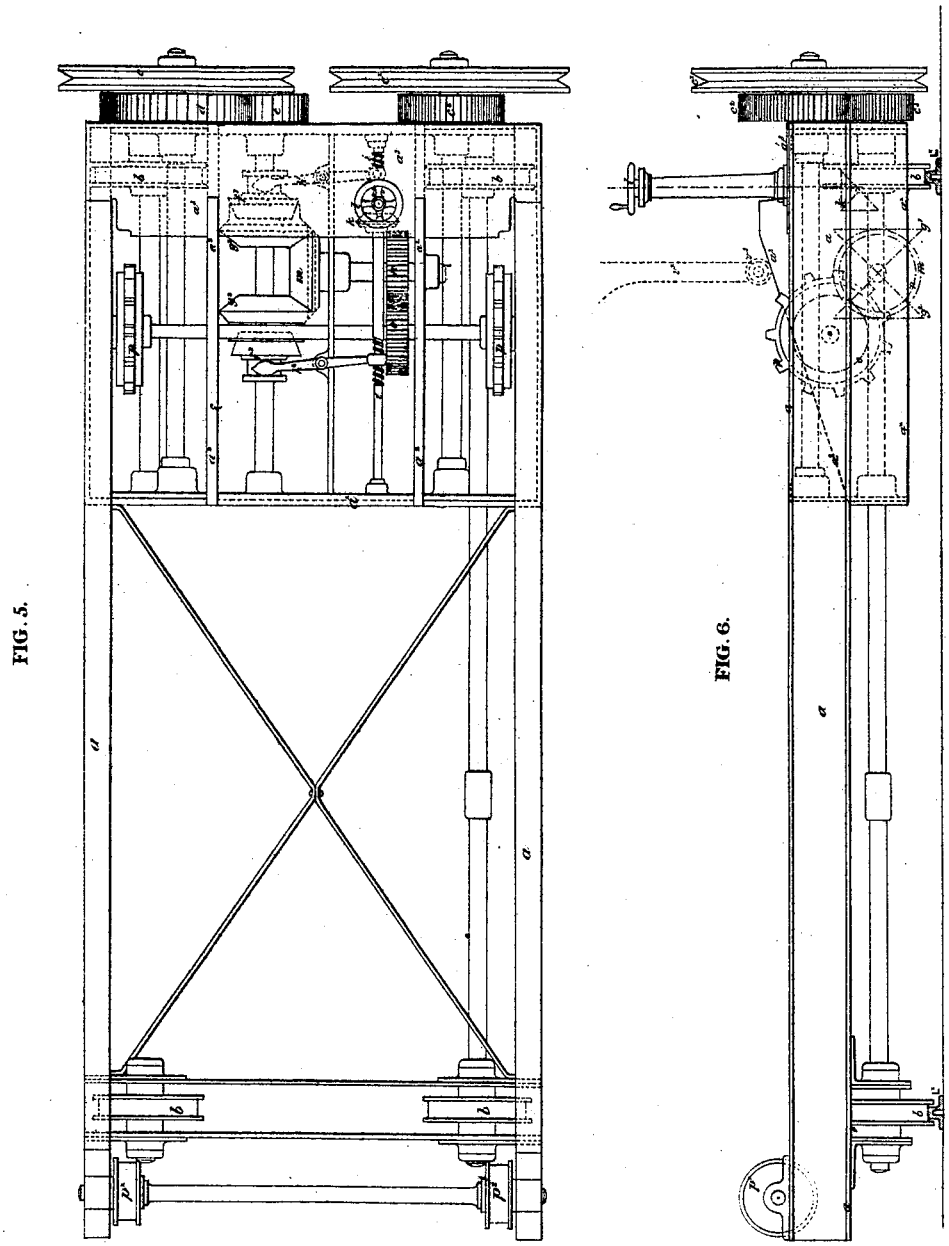
Figure 5:
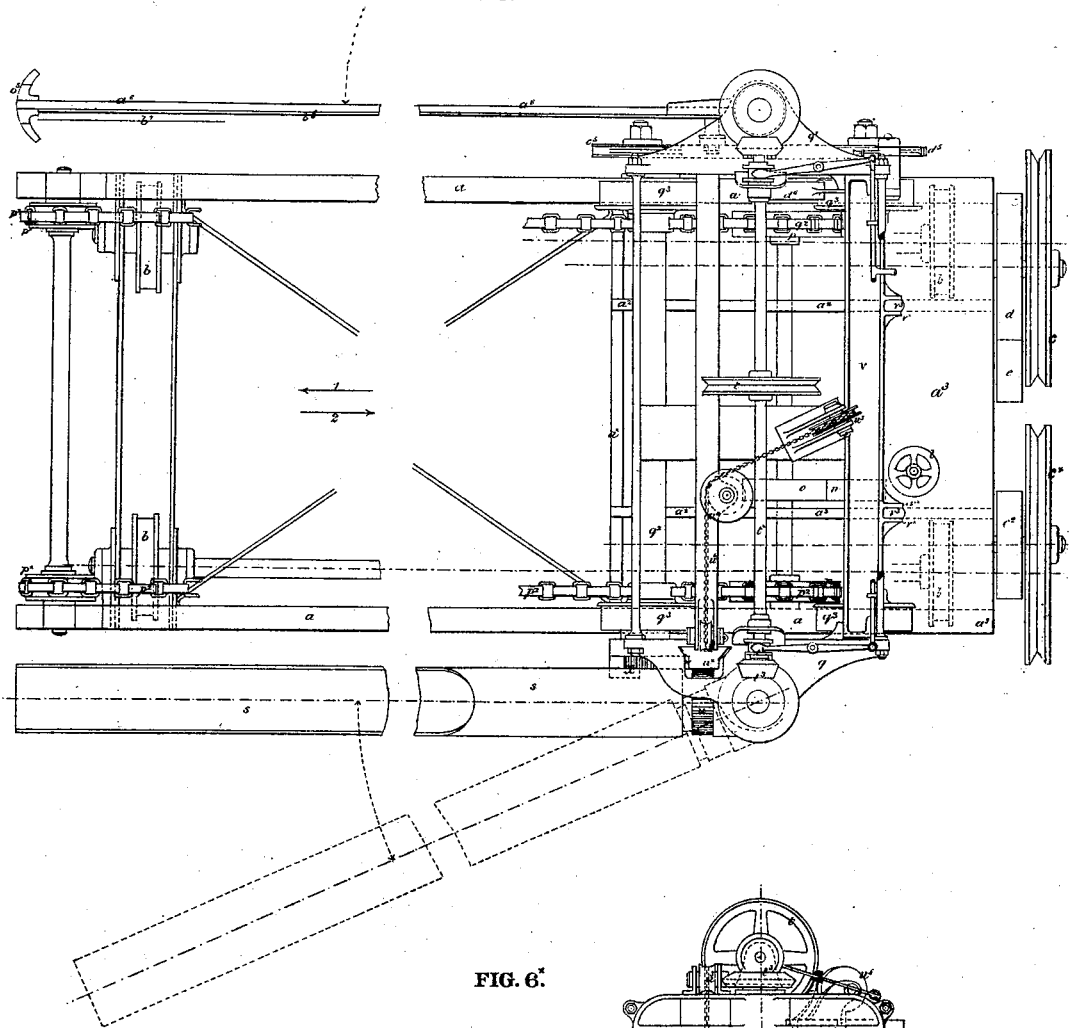
Figure 6:
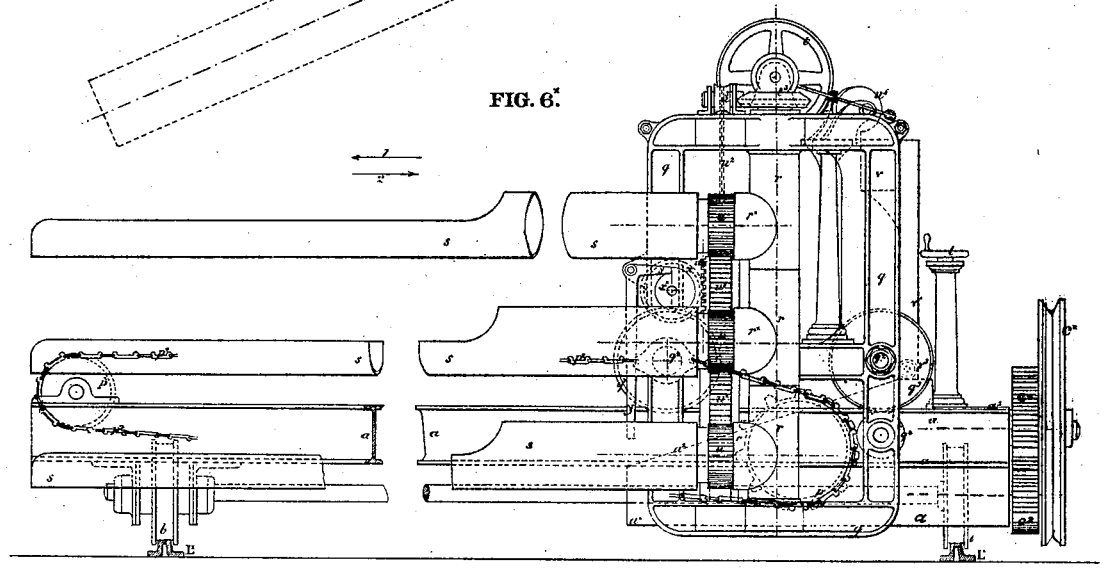

Figure 4, section of tender or feeder.
Figure 5, plan of traveler or under-carriage.
Figure 6, side elevation of same on scoop side.
Figure 7, end elevation of same.
Figure $5^x$, plan of traveler combined with carrier or superimposed carriage.
Figure $6^x$, side elevation of same on scoop side.
Figure $7^x$, end elevation of same.
Figure 8, elevation of apparatus from rake side.
Figure 9, view of scoop in upset position.
Figure 10, details of rake and appurtenances.
Figure 11, details of rake and appurtenances.
Figure 12, end elevation of modification of balance-scoop and rake-arrangement.
Figure 13, diagram elevation of another modification of balance-scoop and rake arrangement.
Figure 14, diagram plan of same.

Fig. 1 is a plan showing the general arrangement of apparatus applied to a retort house;
Fig. 2 is an elevation; and
Fig. 3, a transverse section (across the retort-house) of the arrangement shown in fig. 1.

A A are ordinary retorts arranged in benches, with their rising-pipes or ascension-tubes B leading from the retorts to the ordinary hydraulic main C;

D, ordinary furnace; and

E, ordinary ground-floor or coke-floor of retort-house.

F is the working-floor or stage on which the traveler with the carrier and also the feeder run or travel.

G, platform or stage holding coal to be supplied to the scoops. (See fig. 3.)

H, supply or drop-floor of the coaling-stage G, with movable skip or truck I for dropping coals through openings in the floor H, onto the stage G, at any desired spot, or, in particular, near to where the feeder or tender K, hereinafter mentioned, may be stationed.

L is my improved movable apparatus for carrying the instruments for charging and discharging the retorts. It consists of the traversing frame or traveler and of the superimposed traveling frame, carriage, or carrier, on which the charging and discharging-tools or instruments are mounted.

The traveler runs on rails $L^x$, fixed on the floor F, and the carrier runs on the traveler with a to-and-fro motion in a direction transverse or at right angles to the direction of motion of the traveler.

M are the walls;

N, columns;

O, roofs of retort-house, all of ordinary construction.

In the retort-house is an ordinary stationary steam-engine, P, which transmits motion to an intermediate pulley, Q, which communicates motion to the machine L by an endless wire rope, R, passing from the pulley Q round a driving-pulley, c, on the traveler of the apparatus L, and then to and round another pulley, $c^x$, thereon, (and then round a pulley not shown in the drawing,) mounted at the end of the retort-house, and the wire-rope next returns to and passes round the pulley Q. The apparatus L can thus be brought opposite any desired retorts.

The feeder or tender K, which is the movable apparatus for supplying coal to the chutes, may or may not be coupled with the apparatus L, and pushed or drawn by and at a determined distance from this apparatus L.

Fig. 4 is a section of the tender or feeder K, drawn to double the scale of fig. 3. This fig. 4 also shows the ends of the scoops s carried by the apparatus L.

This feeder K, which is intended to convey coal from the coaling-stage to the discharging-scoops, consists of a moving frame carrying a number of inclined chutes or hoppers, T, one for each scoop s. These chutes are of different lengths so as to open at different levels and thus accommodate themselves to the scoops which they respectively serve, and which, as shown and described, are mounted at different levels.

The feeder K is mounted on wheels $K^2$, which run on rails or trams $K^x$ on the working-floor F.

The frame of the tender K also carries quantity-meters or compartments U, corresponding in number with the chutes T and the scoops s, and placed above and leading into the hoppers T.

These compartments U have floor-valves V, each opening into its respective hopper, as shown by dotted arrows.

The valves V are simultaneously worked by a hand-wheel, W, by means of a screw indicated by a dotted line, and by levers $W^x$, one set being on each side. The back set is shown dotted in fig. 4, and they are similar and parallel to the front or opposite set seen in fig. 3.

X are guard-plates, hinged to the chutes T to prevent spilling of coal while the scoops are being charged. They are worked by levers Z, actuated by a handle, Y.

I now proceed to describe figs. 5, 6, 7, and $5^x$, $6^x$, $7^x$, which refer to the apparatus L.

Fig. 5 is a plan;
Fig. 6, a side elevation; and
Fig. 7, end elevation of the traveler, shown without the superimposed carrier.
Fig. $5^x$ is a plan;
Fig. $6^x$, side elevation; and
Fig. $7^x$, end elevation, showing the traveler combined with the carrier, which is saddled over or rests on the traveler.

In fig. $7^x$ the apparatus is shown, for distinctions, without the pulley-drivers $c\ c^x$ and spur-wheels $d\ e\ c^1\ c^2$, which are seen in fig. 7.

Figs. 6 and $6^x$ are elevations on the scoop side of the apparatus.

Fig. 8 is an elevation of the apparatus, as seen from the rake side, showing the principal parts of the traveler and carrier.

a are girders, and $a^x$ under frame, forming the principal framing of the traveler b, its wheels running on trams or rails $L^x$.

c, one of its driving-pulleys, actuated by wire rope R.

d, spur-wheel driven by pulley c and working a pinion, e, on a shaft, on which are two friction-cones or clutches, $f^1\ f^2$, for bevel-wheels $g^1$ and $g^2$, to be used respectively—that is, according as put into action by levers or clutch-forks, $h^1\ h^2$, fig. 5, which are actuated by screw i, driven by a pair of bevel-pinions, k, from a hand-wheel, l.

The wheels $g^1\ g^2$ gear with a bevel-wheel, but one wheel only of the two wheels $g^1\ g^2$ is in gear at one time with the wheel m, (the other running loose at that time.)

The wheel m is thus driven in one or other direction, as required, and on the shaft of m is a spur-wheel, n, which drives a spur-wheel, o, on the axis of chain-wheels p, which are thus operated.

$p^x$ are loose pulleys, over which the chains $p^2$ of the chain-wheels p run, and give to-and-fro motion to the carrier, as shown by the arrows 1 and 2—that is to say, toward or from the retorts.

The chains are connected with the cross-framing $g^2$ of the carrier, as seen in figs. $5^x$ and $6^x$.

$a^2$ is a pair of inclines fixed to the framing of the traveler.

$a^3$ is a foot-plate for attendant to stand upon.

The second or other driving-pulley, $c^x$, which is actuated by the wire rope R, drives a spur-wheel, $c^1$, which works a pinion, $c^2$, on the axis of one pair of the wheels b, and thus gives motion to the traveler on the rails $L^x$ in a direction transversely to the arrows 1 and 2.

This motion may be reversed by reversing the steam-engine, or by an ordinary clutch arrangement, or by using a duplicate set of driving-pulleys with bands or ropes proceeding from the engine, those of one set running in an opposite direction to those of the other set.

$q\ q^1$ are the two side frames, and $q^2$ cross-framing of the superimposed carrier, which is mounted on wheels $q^3$, running on the girders $a$ of the traveler.

$r$ is a vertical spindle stepped in and supported by a bracket on the frame $q$.

The spindle carries brackets or arms $r^x$, to which the scoops $s\ s$ are fitted, and thereby supported.

Each scoop $s$ is fitted by its end $z$, fig. 9, which is tubular or forms a socket onto an arm, $r^x$. When the spindle $r$ is made to perform a partial revolution the scoops turn or swing round with it.

The spindle $r$ is turned by a chain-wheel or hand-wheel, $t$, working a shaft, $t^x$, having a clutch, $t^2$, and driving a pair of bevel-wheels, $t^3$, one of which is on the shaft $r$, so that the shaft may be turned in the required direction, (carrying the scoops with it.)

Each scoop $s$ is reversed or turned on its respective arm $r^x$ so as to bring its opening uppermost or undermost, as desired. One scoop, $s$, is shown in the upset position in fig. 9. This figure also shows full length of a scoop, the length of the scoops in certain other figures having, for convenience, been broken off or shown indefinite.

This motion is effected by pinions $u$, of which there is one on each scoop end, $z$.

These pinions, when the scoops lie longitudinally of the body of the carrier, are in gear with a sliding and vertical weighted rack, $u^x$, depending from a chain, $u^2$, which passes over pulleys $u^3\ u^4\ u^5$, to a counterbalance or overbalance-weight, $v$, suspended across the carrier, and sliding vertically in guides on the side frames $q\ q^1$.

$v^x$ are two bars or legs on the under side of the weight $v$, guided by rollers $v^2$ on the cross-framing $q^2$, and carrying foot-rollers $v^3$, which rest on inclines $a^2$ on the traveler.

Consequently, as the carrier is moved forward the rack $u^x$ is worked, and the pinions $u$ are turned, and with them the scoops $s$ are turned partially round—that is to say, into the upset position shown in fig. 9.

On one side of the rack $u^x$ is a smaller rack, $w$, which moves with it, and is in gear with a pinion, $x$, on the axis of a snail or cam, $x^x$, formed with a notch or seat for one end of a bell-crank lever, $y$, by which the rack $u^x$ is held, and thus the scoops, when filled, and with their openings uppermost, are prevented from turning or upsetting until the carrier has brought them fully into the retorts, when the long arm of the lever $y$ will strike against a stud or projection (not seen in the figure) on the frame of the traveler, and then the weight $v$ will effect the reversal of the scoops.

The backward movement of the carriage in the direction of the arrow 2 will cause the weight $v$ to be lifted by the inclines $a^2$ and restore the parts to their previous position, the short end of the lever $y$ dropping into its seat in the snail-cam $x^x$.

On the side $q^1$ of the carrier is a vertical spindle, $a^5$, similar in general action and arrangement to the spindle $r$, and swung or turned by similar gearing to that described for working the shaft $r$.

On this shaft, $a^5$, are arms $a^6$, carrying rakes $b^5$.

These rakes consist of movable tips, hinged to the extremity of the arms $a^6$, which also carry sliding motion rods or bars, $b^6$, one to each, by which the rake-tips $b^5$ are moved and changed from the position shown in fig. 8 into the position shown in fig. 10, by a connecting-rod, $b^7$.

$c^5$ is a frame, sliding to and fro, as per arrows 1 and 2 in fig. 8.

This frame carries studs $c^6$, over which the bars $b^6$, which have holes for the purpose, overlap when the arms are swung or moved longitudinally of or alongside of the body of the carrier.

The sliding motion of the frame $c^5$ will thus work the rake-tips.

A hand-lever or segment-rack, $d^5$, with weight $d^6$, works the frame $c^5$ by a rack, $c^7$, thereon.

$e^5$ is a bell-crank detent or stop-lever, one arm of which falls into a notch in the frame $q^1$, as shown in fig. 11, and retains the rake-tips in the position shown in fig. 10, while the rakes enter the retorts, and when at full extent of its travel the long arm of the lever $e^5$ will strike against a stud or projection (not shown in the framing of the traveler) and will place the parts as first described, ready for the return motion.

$q^4$ is a pair of guard-wheels on the carrier-frame, bearing against the under side of the upper flanges of the girders $a$ to prevent the carrier from tipping.

One such wheel, $q^4$, is shown in fig. $6^x$.

I proceed to describe the mode of employing the apparatus.

In order that this explanation may be intelligent I wish it to be understood that when I use the expression longitudinal position in this explanation, and also in the claims annexed to this specification, I mean a position in which the scoops or rakes are longitudinal or lengthwise of the general body of the machine L—that is to say, in a position parallel to the plane of the direction of the arrows 1 2, or, in other words, parallel to a hypothetical vertical plane passing through the hypothetical longitudinal axis or central line of the machine L.

In this position the free ends of the scoops or rakes are directed toward the retorts; and when in this explanation and in the claims annexed to this specification I use the expression "right-angled or other angular position," I mean a position at right angles or other angle to the general body of the machine L, or at right angles or other angle to the direction of the arrows 1 2; or, in other words, at right angles or other angle to a hypothetical vertical plane passing through the longitudinal axis or central longitudinal line of the machine L.

The apparatus is used as follows:

When the retorts are to be charged the feeder or tender K, which is hooked onto the machine L at a gauged distance to suit the position of the scoops, is moved under the front edge of the coaling-stage G, and supplied with coal, which drops through the quantity-meters or compartments into the chutes T.

The spindle $r$ is then turned so as to swing the scoops $s$ in a right-angled position.

In the view, fig. 1, the scoops are shown in dotted lines as just approaching but not quite at such right-angled position.

The valves of the chutes T are then opened so that the coal drops from the chutes T into the scoops $s$, the guard-plates X being depressed to prevent the spilling of coal while the scoops are being charged, and they are lifted to get out of the way of the scoops and their contents when the scoops are swung forward, as about to be described.

The spindle $r$ is then moved in the reverse direction, so as to swing the scoops $s$ with it back to their previous or longitudinal position.

The carrier is then propelled on the traveler toward the retorts, so that the scoops may enter the retorts' mouths, and when fully therein, the scoops are reversed or upset—that is, so turned on their arms $r$ as to bring their openings downward—and they thus drop their charges of coal into the retorts; when this is done, the scoops are turned on their arms to their previous position, or position in which their openings are upward.

The carrier is then drawn back on the traveler so that the scoops clear the retorts, the mouths of which are then closed and the manufacture of gas is proceeded with.

During this operation the rakes or discharging instruments are swung out of the way clear of the retorts—that is to say, they are moved into a right-angled position by turning the spindle $a^5$ in the necessary direction.

But when the retorts have to be drawn or discharged from the exhausted coal or coke, the scoops are swung into this right-angled or out-of-the-way position, and the rakes are swung into the forward or longitudinal position, and the carrier is again moved forward on the traveler, so that the ends of the rakes may enter the retorts, the mouths of which are opened for the purpose.

The rake-tips or ends are worked so that they may be brought into such position as to rake out or draw the contents of the retort. When this is done the parts are restored to their previous position.

I sometimes use separate carriers for the scoops and rakes—that is to say, I mount a set of scoops on one carrier and a set of rakes on another and similarly actuated carrier, such carriers being provided with the appliances above described, and running on the same or different travelers, whereby one set of retorts may be charged while another set is being drawn.

Sometimes, instead of using a steam-engine, I employ hydraulic, pneumatic, or other power for driving the machinery.

I sometimes modify the arrangements for communicating motion to the driving or propelling-wheels of the traveler by mounting on the frame-work of the traveler an upright shaft, carrying at top a horizontal wheel, against which a hemp or other fibrous rope works and imparts motion thereto by frictional contact, such rope receiving motion from the engine P.

At the lower end of the vertical shaft is a worm-wheel, in gear with the driving-wheels, either directly or by intermediate appliances.

I occasionally employ a double set of scoops and a double set of rakes, the scoops and the rakes being respectively two abreast, and of the same or of different lengths. In the latter case they serve retorts of various lengths. Both sets of scoops may be on the same vertical spindle, or each set may have its own spindle; so, also, for the rakes.

Fig. 12 is an end elevation of a modified arrangement, in which a scoop on one side balances a rake on the other side of the carriage.

The scoop and rake are connected by a chain or cord, $r^2$, passing over pulleys, $r^3$, so placed as to guide the chain free of obstructions.

The scoop and rake are not seen in the figure, as they are hidden by their supports, which slide vertically on the respective spindles $r$ and $a^5$.

When the chain $r^2$ is moved in the direction of the arrows 3 4 5 the scoop rises and the rake descends, and vice versa when the chain is moved in the opposite direction.

The figure corresponds generally in other respects with fig. 7$^x$, and though (for more distinctly showing the balanced action) several parts are omitted in fig. 12, it is to be understood that the scoop may be turned and righted by arrangements such as hereinbefore described, and the rake-tips may in like manner be worked by sliding rods, or they may be actuated by hand; also, both scoop and rake may be made to turn or swing round, as described, in reference to the first-described arrangement; also, more than one scoop and one rake may be fitted on the spindles $r$ $a^5$.

Fig. 13 is a diagram elevation, and

Fig. 14 diagram plan of another modification of balanced scoop and rake, admitting of their adjustment to any height required. The top framing of the carrier is (for distinctness) removed.

In this modification, instead of using the spindles and their arms, slides $q^6$, fig. 14, are used, working in grooves or seats, $q^7$, fig. 13, on the side frames $q$ $q^1$, permitting the balanced vertical motion above referred to.

To the slides $q^6$ are hinged the scoops $s$ and rake-arms $a^4$ in such manner that they may swing round.

To the slides $q^6$ are also hinged frames, $q^8$, for carrying the counterpoises $q^9$.

$v$ is the overbalance-weight for rack $u^x$, working as before.

$v^5$, frame (on the carrier) on which the weight $v$ rises and falls.

$a^2$, inclines, on which foot-rollers, $v^3$, (one only seen in fig. 13,) of the weight $v$ run.

Where single retorts are used—that is to say, short retorts, having an opening at both ends, the tips of the raking instrument may be readily made of proper form to rake or push out the coke at the back end of the retort instead of at the front end. This form is well known.

Sometimes, and especially when the apparatus is narrow, I may use, instead of the above-described duplicate arrangement of chain-wheels with their chain-pulleys and chains, a single arrangement of this description, which I place midwise or at some intermediate convenient position on the framing; and I mount one pair of the running wheels fast upon a common axle, extending across the carrier from wheel to wheel, (the second may be so treated also,) and I place toothed wheels alongside and moving with these running wheels; and I mount racks alongside the tram-rails, into which the toothed wheels gear; and similarly with regard to the traveler, I use toothed wheels alongside of and moving with a pair of its running wheels fast upon a common axle extending lengthwise from wheel to wheel; or both pairs of wheels may be so treated if desired.

I sometimes substitute for the weight $v$ springs, acting one on the side $q$ and one on the side $q^1$, and pressing on a bar which crosses the machine and works in grooves similarly to the weight $v$. The springs thus disposed act as mechanical equivalents to the weight $v$, and in a mechanically equivalent manner. Also, I sometimes employ springs on the rack $u^x$ instead of weights, such springs acting as a mechanical equivalent to such weight or weighting of the rack.

Instead of using a rack for turning the scoops, chains may be used for connecting the weight or spring with the scoops, such chains winding on the scoop ends, and, when actuated by the weight, turning the scoops.

I sometimes add scrapers to the end of the rakes, formed either by extending or curling the rake-tips further upward than shown in fig. 10, or by adding a separate scraping-tool to the rake-arms.

In order that some of the scoops may be used while others are not used, I sometimes adopt the following arrangement:

Instead of forming the arms $r^x$ as fixtures to or in a piece with the spindle $r$, I form them of elbow-shape.

The vertical part of the elbow, which is tubular, embraces or is threaded or fitted on the spindle $r$.

The horizontal part of the elbow receives the socket end $x$ of the scoop $s$.

I attach these arms to the spindle $r$ by pins, set-screws, jam-nuts, or other like removable or adjustable contrivances, so that when thus held they may turn with the spindle; but when it is desired that some of the scoops shall not swing or turn with the spindle $r$ I remove the pins or slack the nuts or screws of those arms to which are fitted such scoops as are not to turn or swing; hence, some of the scoops will remain stationary while the others turn or swing round. I adopt a like arrangement with respect to the mounting of the rakes.

The apparatus, though shown in the drawing and described in reference thereto as applied to the charging and discharging of gas-retorts, may be arranged and applied in like manner for other similar purposes.

Fig. 1 is on sheet 1.
Figs. 2, 13, and 14 are on sheet 2.
Figs. 3, 4, and 12, on sheet 3.
Figs. 5 and 6 are on sheet 4.
Figs. 5× and 6× are on sheet 5.
Figs. 7, 7×, 8, 9, 10, and 11 are on sheet 6.

Having now described the nature of said invention, and in what manner the same may be performed, I declare that—

I claim as my improvements in apparatus for charging and discharging gas-retorts, and for other similar purposes—

1. A system of scoops and rakes, varying in number, for charging and discharging gas-retorts, mounted upon vertical spindles, the spindles passing through hollow or socket ends in said scoops and shovels, and forming an axis whereby they can be turned laterally to any position required, arranged and actuated substantially as set forth.

2. The arrangement and combination of parts constituting the modification of apparatus hereinbefore described, in which one or more scoops on one side of the machine balance one or more rakes on the other side, as and for the purpose substantially as set forth.

3. The herein-described arrangement of parts for transmitting motion to the traveler and the carrier by means of pinions gearing into racks on the rails, trams, or ways, substantially as set forth.

4. The employment of rollers or wheels working on flanged trams or rails, as described, for preventing lateral tipping of the carrier.

5. The compartments U U of the feeder K, provided with floor-valves V, chutes or hoppers T T with the hinged guard-plates X, combined and operating in reference to the scoops S, substantially as herein shown and described.

J. J. HOLDEN.

Witnesses:
 EDE PASS, 68 *Fleet Street, London,*
 E. EDMONDS, 68 *Fleet Street, London.*